United States Patent [19]

Takanashi et al.

[11] Patent Number: 4,691,227

[45] Date of Patent: Sep. 1, 1987

[54] COLOR IMAGING APPARATUS HAVING A 1:2 FREQUENCY RATIO BETWEEN VIDEO AND REFERENCE SIGNALS FOR HIGH S/N COLOR DEMODULATION

[75] Inventors: Itsuo Takanashi, Yokohama; Shintaro Nakagaki, Fujisawa; Hiroshi Ichimura; Takashi Kuriyama, both of Tokyo, all of Japan

[73] Assignee: Victor Company of Japan, Ltd., Japan

[21] Appl. No.: 783,538

[22] Filed: Oct. 3, 1985

[30] Foreign Application Priority Data

Oct. 6, 1984 [JP] Japan .............................. 59-210255
Dec. 3, 1984 [JP] Japan .............................. 59-255280

[51] Int. Cl.[4] .............................................. H04N 9/07
[52] U.S. Cl. .......................................... 358/47; 358/25
[58] Field of Search .................. 358/41, 47, 43, 23, 358/25

[56] References Cited

U.S. PATENT DOCUMENTS 4,041,528 8/1977 Miyoshi .................................. 358/47

Primary Examiner—Tommy P. Chin

Attorney, Agent, or Firm—Lowe, Price, Leblanc, Becker & Shur

[57] ABSTRACT

In a single-tube color image pickup apparatus, an optical image is passed through a color stripe filter having recurrent groups of different color stripes to a photoelectrical conversion target, which is scanned by an electron beam to generate a video signal comprising a carrier having a frequency inversely proportional to the intervals at which the recurrent groups of filter strips are arranged. The carrier is modulated in phase with the stripes of each group and in amplitude with the intensity of the optical image. Prior to operation, the target is uniformly illuminated with light of a predetermined color to generate the carrier, which is stored into a field memory. During operation the memory is repeatedly addressed to generate a reference signal. The frequency of the reference signal is converted so that the video signal and the frequency-converted reference signal have a frequency ratio of 1:2 and an opposite phase relationship therebetween. A color demodulator receives these signals to derive a pair of color component signals for coupling to a matrix circuit to which a luminance component is also applied.

15 Claims, 10 Drawing Figures

LEGEND:
$S_1 = A \sin(\omega t + \phi + \theta)$
$S_1' = A \sin(\omega t + \theta)$
$S_2 = \cos(3\omega t + 3\theta)$
$S_3 = \frac{A}{2} \sin(2\omega t - \phi + 2\theta)$

| LEGEND | | |
|---|---|---|
| | F1 | F2 |
| | GREEN | CYAN OR YELLOW |
| | BLUE | CYAN OR MAGENTA |
| | RED | YELLOW OR MAGENTA |

W: WHITE LIGHT

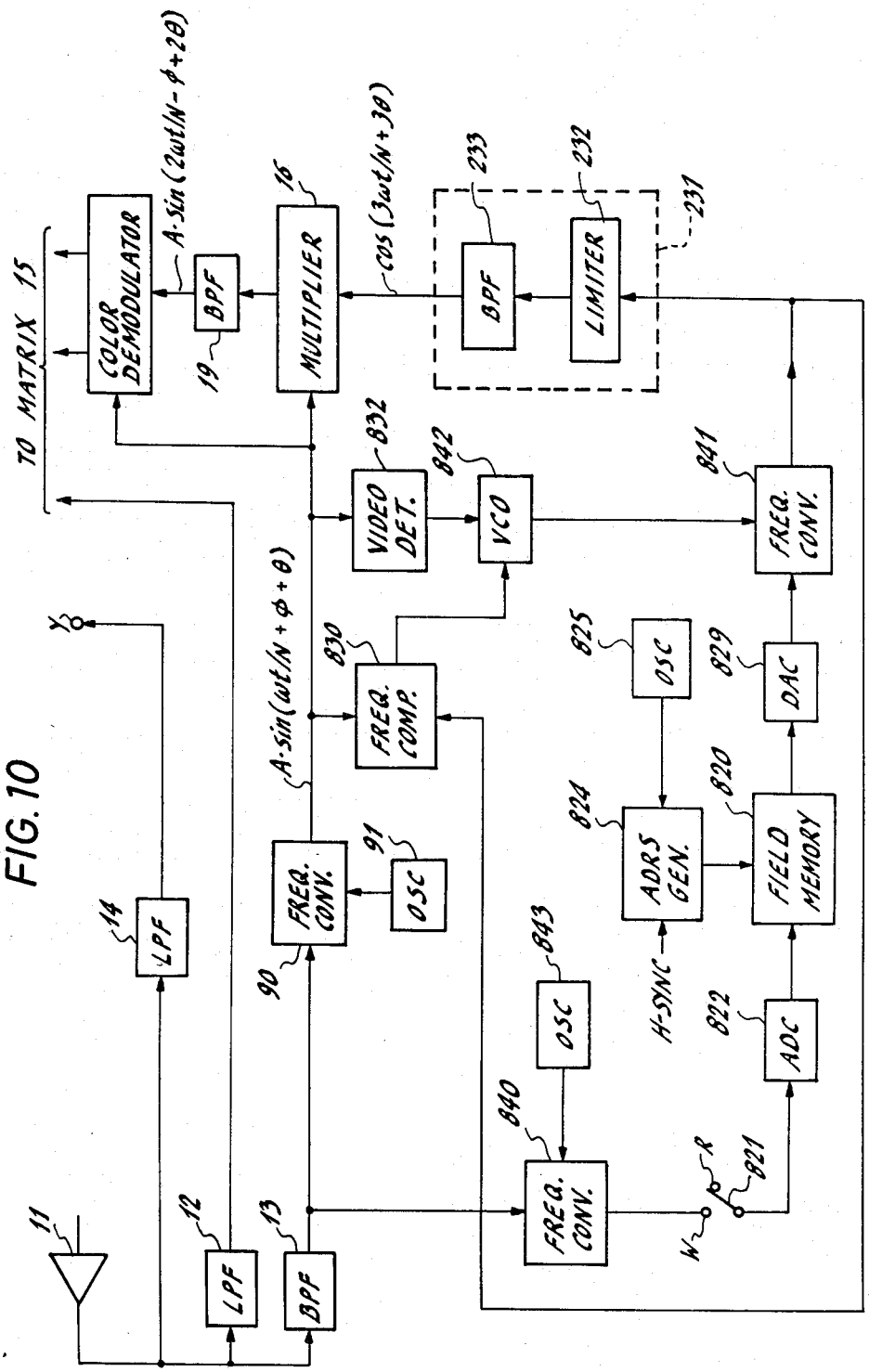

COLOR IMAGING APPARATUS HAVING A 1:2 FREQUENCY RATIO BETWEEN VIDEO AND REFERENCE SIGNALS FOR HIGH S/N COLOR DEMODULATION

BACKGROUND OF THE INVENTION

The present invention relates to a single-tube color television imaging apparatus having a field memory in which the beam deflection system's nonlinearity information is stored as a reference signal for generating primary color video signals.

In single-tube color television imaging apparatus, a color filter is affixed to the photoelectrical conversion target of the image pickup tube to generate a color-multiplexed video signal.

Various proposals have been made in the arrangement of color filter stripes and in the circuit configuration that enables detection of primary colors. One such color filter comprises a plurality of successively arranged, recurrent groups of filter stripes of different colors. When the target is illuminated with light of uniform intensity having one of the colors of the filter stripes, an electron beam scanning the target generates a constant-amplitude signal at a constant frequency equal to the spatial frequency of the recurrent groups of the filter stripes. This signal is equivalent to a "carrier" as used in conventional modulation systems. When the target is illuminated with an actual color image, the "carrier" is modulated in amplitude in accordance with the intensity of picture elements and in phase in accordance with the arrangement of the individual stripes of the color filter. The resultant signal contains DC and luminance components, a fundamental frequency component having the same frequency as the carrier and a second harmonic component.

In copending U.S. patent application No. 582,226, the fundamental frequency component is detected from the color-multiplexed video signal by means of a pair of synchronous detectors using a pair of reference phase signals. To compensate for nonlinearity inherent in the beam deflection system, the reference phase signals are derived from a field memory in which the "carrier" of a field interval is stored. The outputs of the synchronous detectors are applied to a color matrix where they are combined with the DC component of the color-multiplexed signal to derive signals of the three primary colors.

It is known that individual color components can be detected with a high signal-to-noise ratio if the inputs to a color matrix include as many frequency components of the color-multiplexed signal as possible. However, due to undesirable factors including the finite size of beam spot, a tendency of the "carrier" modulation index to decrease at high frequencies, and a distribution of various components of noise generated by the image pickup tube, the harmonic components of the color-multiplexed signal are more contaminated with noise than the fundamental component is. For this reason, a further improvement in signal-to-noise ratio has been desired. One approach to this problem is to employ a color filter of the type having recurrent groups of magenta, cyan and yellow filter stripes. However, a satisfactory level of luminance signal cannot be obtained.

SUMMARY OF THE INVENTION

Accordingly, an object of the present invention is to provide a color imaging apparatus which permits high signal-to-noise ratio color demodulation while satisfying the required level of luminance signal.

This object is obtained by generating video and reference signals such that their frequencies are in a 1:2 ratio and applying them to a color demodulator.

In a single-tube color imaging apparatus of the present invention, an optical image is passed through a color stripe filter having recurrent groups of different color stripes to a photoelectrical conversion target. The target is scanned by an electron beam to generate a video signal comprising a carrier having a frequency inversely proportional to the intervals at which the recurrent groups of filter strips are arranged. The carrier is modulated in phase with respect to a reference phase in accordance with the stripes of each group and in amplitude with the intensity of elemental areas of the optical image. Prior to operation, the target is uniformly illuminated with light of a predetermined color to generate the carrier, which is stored in a field memory. During operation the memory is repeatedly addressed to generate a reference signal having the reference phase. The frequency of the reference signal is converted so that the video signal and the frequency-converted reference signal have a frequency ratio of 1:2 and an opposite phase relationship therebetween. A color demodulator receives these signals to derive a pair of color component signals for coupling to a matrix circuit to which a luminance component is also applied.

To simplify the circuitry of the color demodulator it is preferred that the frequencies of the video and reference signals be reduced by an equal factor by means of frequency converters.

Preferably, a frequency multiplier is provided to multiply the output signal of the memory. The frequency-multiplied signal is fed to an amplitude multiplier to multiply it on the video signal to generate a reference signal having twice or one-half the frequency of the video signal.

In a further preferred embodiment, a frequency comparator is provided to detect the difference in frequency between the video and reference signals to control their frequencies with respect to each other to reduce the frequency difference to zero.

BRIEF DESCRIPTION OF THE DRAWINGS

The present invention will be described in detail with reference to the accompanying drawings, in which:

FIG. 10 is a block diagram of an alternative form of the embodiment of FIG. 9.

DETAILED DESCRIPTION

Figure 1:
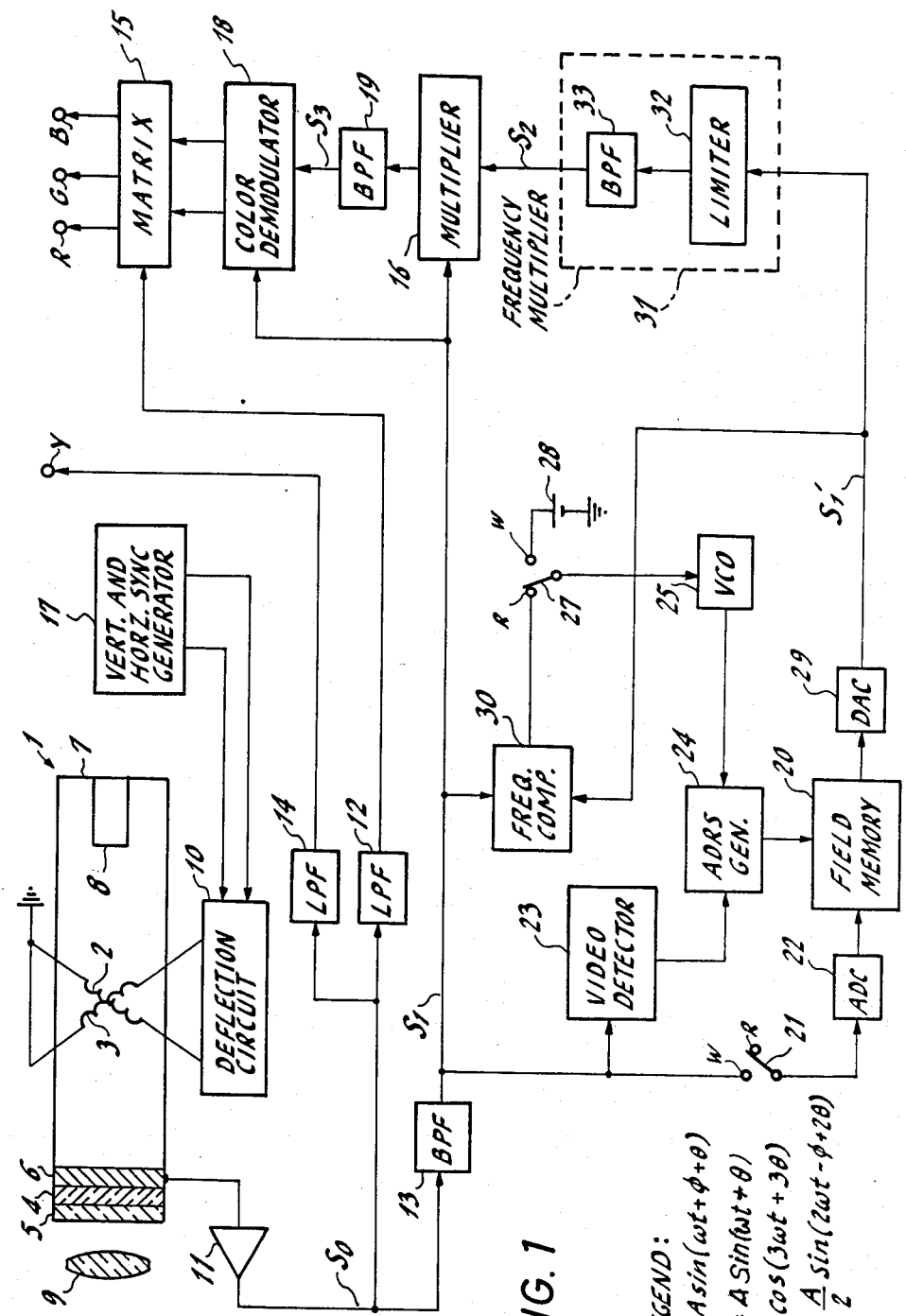
FIG. 1 is a block diagram of a first preferred embodiment of the present invention.

Referring now to FIG. 1, there is shown a color television imaging apparatus according to a preferred embodiment of the present invention. The apparatus includes a color television pickup tube 1 having a pair of vertical and horizontal deflection yokes 2 and 3, a color stripe filter 4 affixed to the rear side of a transparent faceplate 5 of an evacuated envelope 7, a photoelectrical conversion target 6 attached to the rear of the filter 4 to be scanned by an electron beam emitted from an electron gun 8. A lens 9 focuses an object scene on the surface of the target 6 through the color filter 4. A video signal is read from the photoconductive layer of the conversion target 6 and applied to a preamplifier 11.

Figure 2:
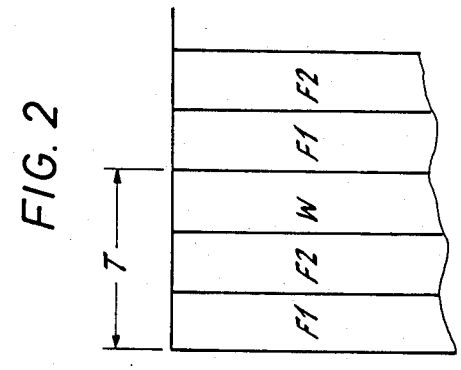
FIG. 2 is an illustration of a color stripe filter.

An example of the color filter 4 is illustrated in FIG. 2. This filter comprises a plurality of recurrent groups of stripes having a first color F1 (which may be one of the primary colors of blue, green and red), a second color F2 (which is cyan or magenta if F1 is blue, cyan or yellow if F1 is green, or yellow or magenta if F1 is red), and transparent for passing white light. These stripes have equal width and extend vertically throughout the target 6 and successively arranged across the horizontal dimension of the target 6 with the color stripes of each group recurring at intervals T. The filter 4 has therefore a spatial frequency inversely proportional to the periodic interval T. Light passing through the color filter 4 is optically modulated by the striped color filter pattern and develops an electrostatic image on the conversion target 6 which is read by the electron beam scanned. Raster scan is provided by the horizontal and vertical yokes 2 and 3 energized by sweep currents supplied from a deflection circuit 10 in response to vertical and horizontal sync pulses from a vertical and horizontal sync generator 17.

For purposes of illustration, it is assumed that the first filter stripe F1 is green and the second stripe F2 is cyan. The light incident on the green stripes is removed of its red and blue components to allow its green component to pass to target 6, while the light incident on the cyan stripes is removed of the red component (R) to allow its green (G) and blue (B) components to pass to target 6. Therefore, if the target is illuminated with an imagewise radiation of white light (equal energies at all wavelengths throughout the visible spectrum), the color-multiplexed signal contains (G), (B+G) and (R+B+G) components derived respectively from stripes F1, F2 and W. Therefore, the video signal $S_0$ obtained from the target 6 is given by:

$$S_0 = \frac{1}{3}(3G + 2B + R) + A \cdot \sin(\omega t + \phi + \theta) + \frac{A}{2}\sin(2\omega t - \phi + 2\theta) \quad (1)$$

where, $$A = -(\sqrt{3}/\pi)(B^2 + B \cdot R + R^2)^{\frac{1}{2}}$$

$$\phi = \tan^{-1}(B - R)/\sqrt{3}(R + B)$$

$$\omega = 2\pi/T = 2\pi f_1$$

(where, $f_1$ represents the frequency of the "carrier"). The phase component $\phi$ indicates a phase deviation from the reference phase of the "carrier" and represents the spatial difference between the individual color stripes within each recurrent group, and the phase component $\theta$ represents a phase deviation attributed from the nonlinearity of the deflection system.

The first term of Equation 1 indicates the DC component which is a mixture of the primary three colors. The second term of Equation 1 represents the "carrier" modulated in accordance with the color information derived from a mixture of two primary colors excluding the color of the first stripe F1. In the illustrated embodiment in which the first stripe is green, these two primary colors are red and blue. The third term of the Equation represents the second harmonic of the modulated "carrier". It is seen that the second harmonic has an opposite phase $\phi$ to the phase of the fundamental component.

Figure 3:
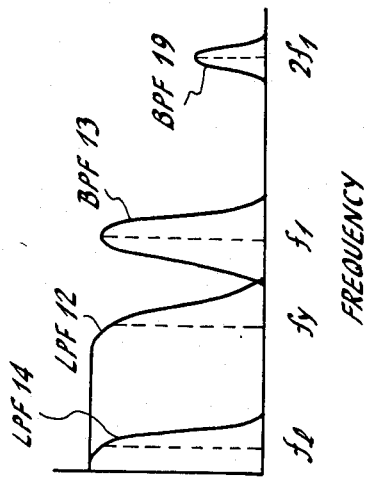
FIG. 3 is an illustration of the video frequency spectrum of a color-multiplexed video signal obtained when a color image is passed through the color filter to a photoelectrical conversion target.

The modulated "carrier" $S_0$ is amplified by preamplifier 11 and applied to a low-pass filter 14 having a cut-off frequency fy as illustrated in FIG. 3 to supply a luminance component to an output terminal Y. A low-pass filter 12 having a cut-off frequency f1 is coupled to the preamplifier 11 to obtain the DC component, or first term of Equation 1, for coupling to a matrix 15. A band-pass filter 13 has a passband having a center frequency $f_1$ to obtain the fundamental frequency component, or second term of Equation 1 for coupling to first inputs of a multiplier 16 and a color demodulator 18.

According to the present invention, the second input of color demodulator 18 is supplied with a signal having twice the frequency of the modulated color-multiplexed "carrier", which corresponds to the third term of Equation 1. To derive the signal to be applied to the second input of the color demodulator 18, while compensating for nonlinearity inherent in the deflection waveforms generated by the deflection circuit 10, the apparatus includes a field memory 20 in which is stored information on the nonlinearity of the deflection system. This information is derived by flooding the target 6 with a radiation of a predetermined primary color of uniform intensity and generating a reference signal representing the "carrier". This non-modulated "carrier" is represented by:

$$S_1' = A \sin(\omega t + \theta) \quad (2)$$

The nonlinearity information is written into the memory 20 with a switch 21 being positioned in the write terminal W through an analog-to-digital converter 22. At the same time, a switch 27 is positioned in the write terminal W to supply a voltage-controlled oscillator 25 with a predetermined voltage from a reference voltage source 28 to drive it at a constant frequency during the write-in mode.

A video carrier detector 23 is provided which essentially comprises a D-type positive edge-triggered flip-flop having its clock input coupled to the output of band-pass filter 13 and its clear input coupled to the horizontal sync generator 17 with the D input and preset input terminals being grounded. The video carrier detector 23 detects the leading edge of the output of the band-pass filter 13 that occurs at every line scan to generate an enabling signal which lasts until this flip-flop is reset by a subsequent horizontal sync pulse. This enabling signal is applied to an address generator 24 to enable it to respond to the output of oscillator 25 for the duration in which the electron beam scans moves from one edge of the target 6 to the other. During the write-in mode, address codes are generated at a constant rate by the address generator 24 specifying the matrix cell locations of the field memory 20 to store digitized "carrier".

In readout modes, switches 21 and 27 are manually switched to the read terminal R and memory read operation commences in response to an enabling signal from the video carrier detector 23 and the stored "carrier" is repeatedly read out of the memory in a nondestructive manner into a digital-to-analog converter 29. Pulse generator 25 derives its frequency control voltage from the output of a frequency comparator 30. Frequency comparator 30 compares the video signal from band-pass filter 13 with the output frequency of the D/A converter 29 to detect the frequency difference therebetween. The output frequency of the VCO 25 is thus controlled so that the frequency difference reduces to zero. Since the address generator 24 is reset to a predetermined phase at the leading edge of the video line signal, the reference signal from the memory is in phase with the video signal from band-pass filter 13. The latter video signal is the fundamental frequency component of the color-multiplexed signal and is conveniently designated $S_1$. Signal $S_1$ will be multiplied in multiplier 16 with a signal derived from the field memory 20 in a manner to be described.

Field memory 20 is read synchronously with the actual beam scanning speed of the pickup tube 1. As a result, the nonlinearity of beam deflection signals and the variations in the deflection signals due to instability of deflection circuit and yokes are effectively compensated.

The output of the D/A converter 29 is further applied to a frequency multiplier 31 which provides a signal $S_2$ having a frequency three times higher than the frequency of the reference signal $S_1'$, the signal $S_2$ being given by:

$$S_2 = \cos(3\omega t + 3\theta) \quad (3)$$

Specifically, the frequency multiplier 31 comprises a limiter 32 for limiting the amplitude of the incoming signal and a band-pass filter 33 having a frequency three times higher than the frequency of the reference signal $S_1'$. The third harmonic $S_2$ of the reference signal is applied to the second input of the multiplier 16. Signals $S_1$ and $S_2$ are multiplied with each other to produce a product $S_3$ at the output of a band-pass filter 19 having a passband with a center frequency $f_2$ equal to the second harmonic frequency $2\omega t$. Being given by $(A/2)\sin(2\omega t - \phi + 2\theta)$, signal $S_3$ exactly corresponds in frequency and phase to the second harmonic of the modulated "carrier". Being derived from the product of the noiseless nonmodulated "carrier" and the fundamental frequency component of the modulated "carrier" which is more immune to noise than the second harmonic, signal $S_3$ has a higher signal-to-noise ratio than the second harmonic of the modulated "carrier". Therefore, the color demodulator 18 is supplied with signals of high signal-to-noise ratios.

Figure 4:
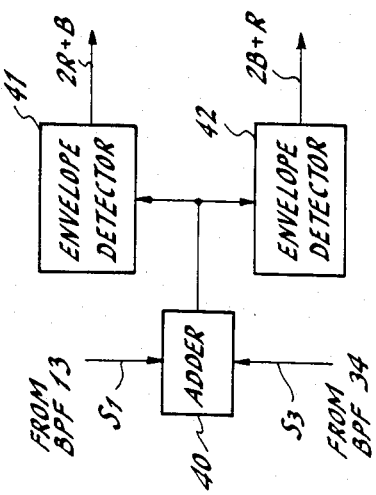
FIG. 4 is an illustration of details of a typical color demodulator.

FIG. 4 illustrates one example of the color demodulator 18. Color demodulator 18 typically comprises an adder 40 for summing the signals $S_1$ and $S_3$ with each other, a first envelope detector 41 for dectecting the upper envelope of the summed signal to produce a signal $2R+B$ and a second envelope detector 42 for detecting the lower envelope of the summed signal to produce a signal $2B+R$. Signals $(2R+B)$ and $(2B+R)$ are combined in the matrix 15 with the luminance component to produce a set of primary color signals.

Figure 5:
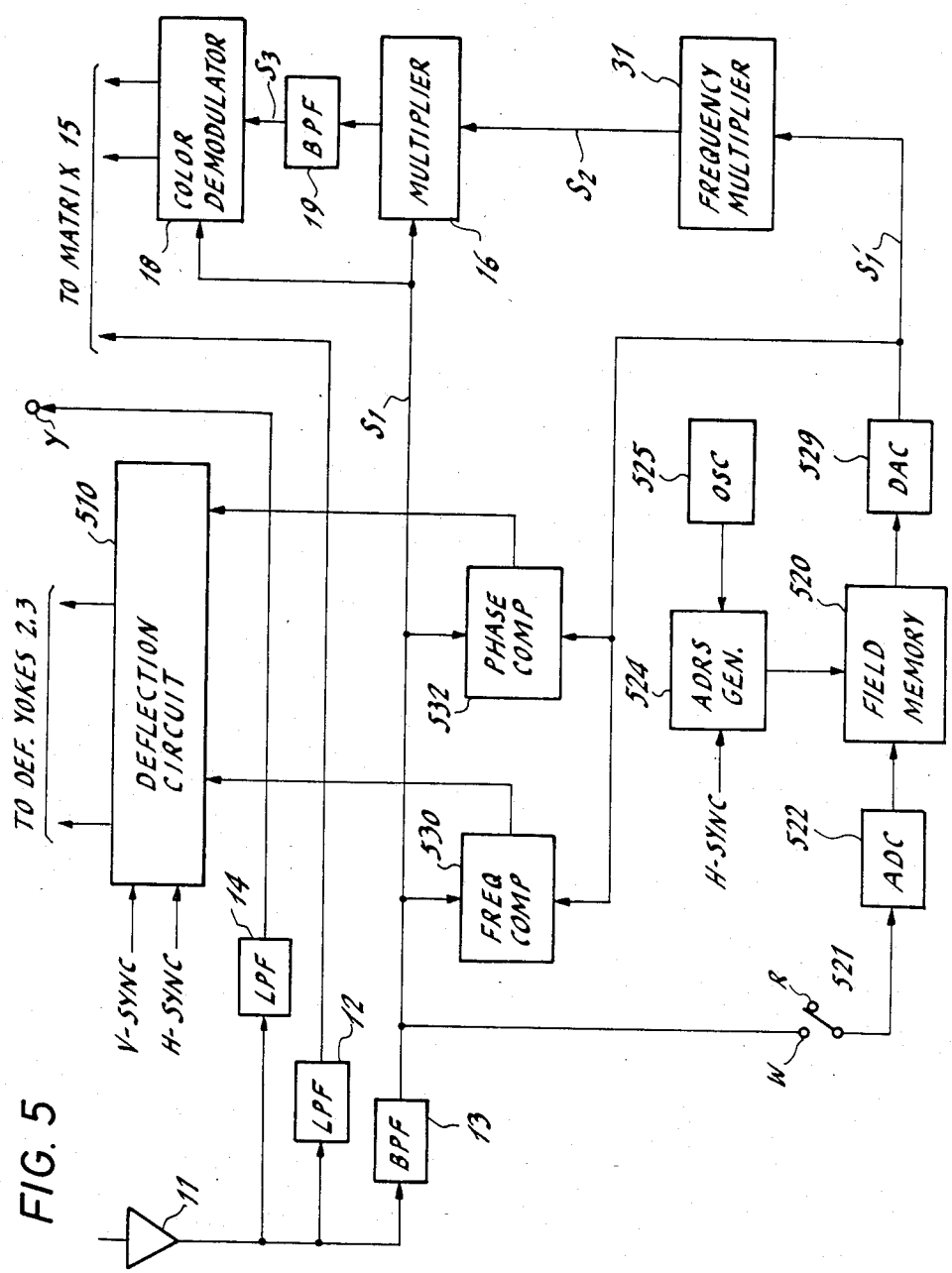
FIG. 5 is a block diagram of a modification of the present invention for generating a reference signal.
Figure 6:
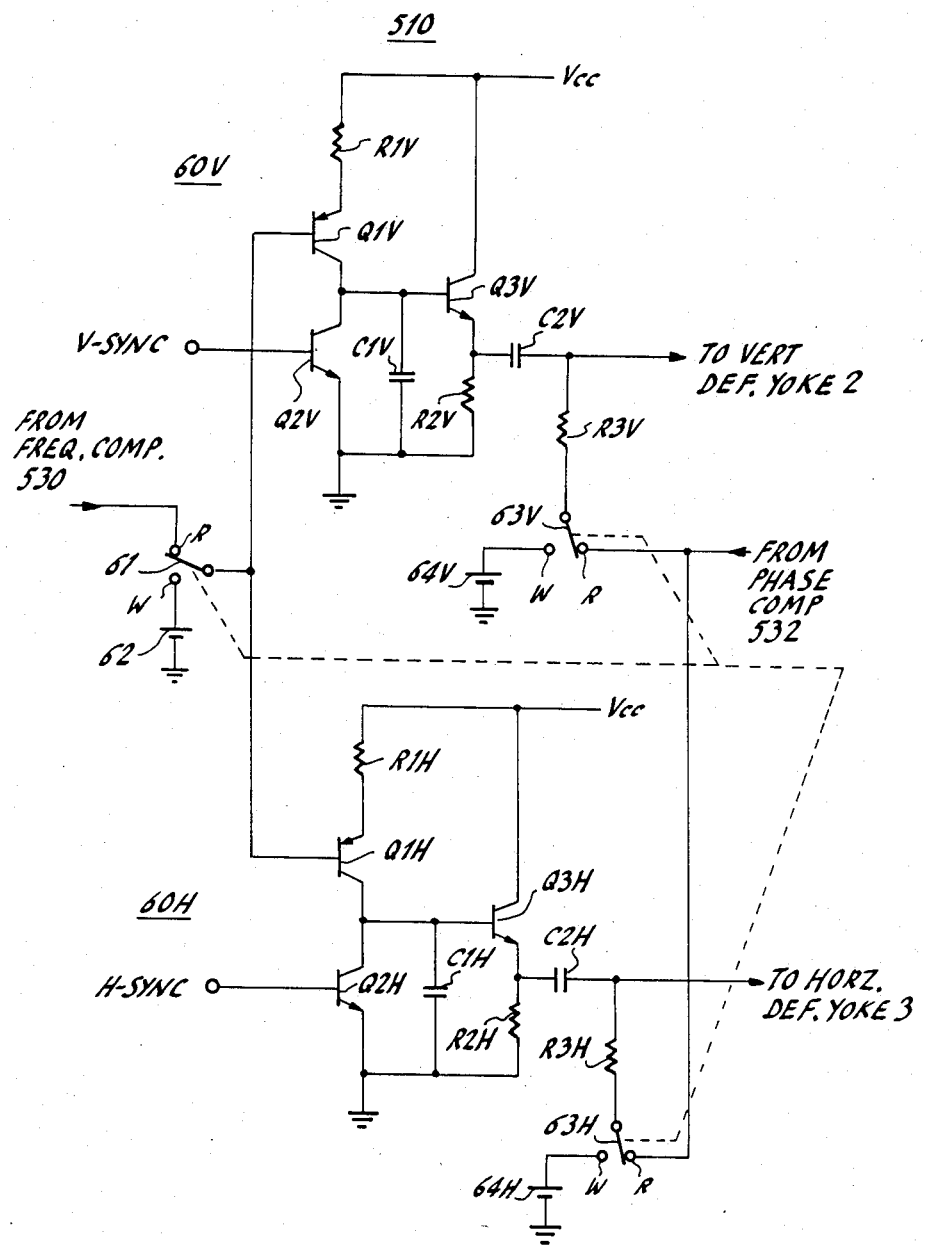
FIG. 6 is a circuit diagram of the deflection circuit of FIG. 5.
Figure 7:
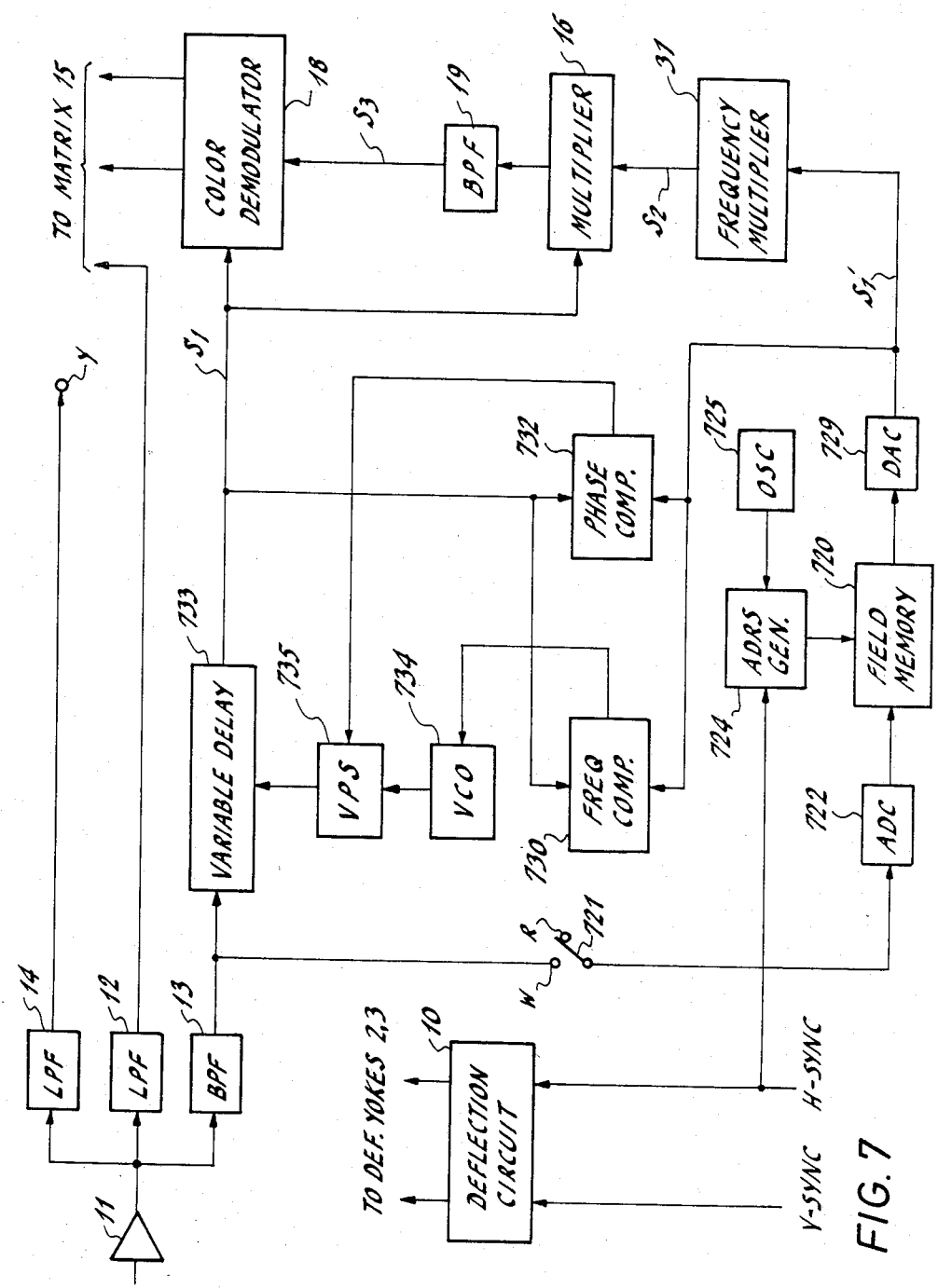
FIG. 7 is a block diagram of a further modification of the present invention for generating the reference signal.

FIGS. 5 to 7 are illustrations of modified forms of the circuit for generating the reference "carrier".

The embodiment of FIG. 5 differs from the FIG. 1 embodiment in that the frequency and phase match is provided by controlling the electron beam while reading the field memory at a constant frequency. Specifically, a constant frequency oscillator 525 supplies constant frequency clock pulses to address generator 524 for addressing the field memory 520 at a constant rate. The output signal from DA converter 529 thus contains components reflecting the nonlinearity and instability of the deflection system. A phase comparator 532 is provided to detect a phase deviation of the video signal from the output of D/A converter 529. The output signal from the phase comparator 532 indicates the amount of deviation of the beam from the center of target 6 as a result of the deflection system's instability. Frequency comparator 530 provides a frequency deviation signal indicating the variation in the deflection waveforms resulting from the instability. The output signals from the two comparators 530 and 532 are applied to deflection circuit 510.

As shown in detail in FIG. 6, the deflection circuit 510 comprises a vertical deflection circuit 60V and a horizontal deflection circuit 60H of identical construction with different circuit parameters. Each of the deflection circuits includes a constant current source formed by a resistor R1 and a transistor Q1 connected in a series circuit with a switching transistor Q2 from a voltage supply Vcc to ground. The bases of transistors Q1V and Q1H are coupled together to a moving contact arm of a manually operated switch 64 and the bases of transistors Q2V and Q2H are biased by vertical and horizontal sync pulses, respectively. The read-write switch has a write terminal W impressed with a reference voltage by a voltage source 62 and a read terminal R to which the output of frequency comparator 530 is applied.

The collector-emitter path of transistor Q2 is in shunt with a storage capacitor C1 which charges through the constant current source when the transistor Q3 is nonconductive and discharges when the latter is biased conductive in response to the respective sync pulse. The voltage developed across the capacitor C1 biases a transistor Q3 which is in series with a resistor R2, forming a buffer amplifier. Voltages developed across resistors R2V and R2H are applied through coupling capacitors C2V and C2H to deflection yokes 2 and 3 respectively.

Manually operated mode select switches 63V and 63H are ganged with switch 61. The read terminals R of switches 63V and 63H are coupled together to the output of phase comparator 532 and the write terminals W are impressed with beam centering reference voltages from voltage sources 64V and 64H, respectively. Each of the switches 63 has a moving contact arm which is coupled by a resistor R3 to the associated deflection yoke.

During write operation, switches 521, 61, 63V, 63H are turned to the write position W. The constant current source transistors Q1V and Q1H are biased at a reference potential to generate vertical and horizontal reference sweep voltages. The vertical and horizontal yokes are respectively impressed with the reference sweep voltages which are respectively summed with beam centering reference potentials which are determined so that the electron beam is exactly centered on the target. The target is then illuminated with a radiation of a predetermined color in the same manner as in the previous embodiment to generate a "carrier" and applied through band-pass filter 13 and through switch 521 to A/D converter 522 and stored into field memory 520 at a constant rate.

During readout operations, the transistors Q1V and Q1H of the deflection circuit 510 are biased with an error voltage supplied from the frequency comparator 530 so that the vertical and horizontal sweep waveforms are adjusted in a direction tending to compensate for any variations in the deflection waveforms. The phase error signal from the comparator 532 is applied to the yokes 2 and 3 to compensate for beam's deviation from the calibrated center position. As in the FIG. 1 embodiment, the frequency of reference "carrier" $S_1'$ from D/A converter 529 is tripled by frequency multiplier 31. The output of frequency multiplier 31 is multiplied in amplitude on a modulated "carrier" $S_1$ from band-pass filter 13 by multiplier 16, producing a synthesized second harmonic $S_3$ from the output of band-pass filter 19 for coupling to the color demodulator 18.

The embodiment of FIG. 7 employs a variable delay line 733 for effecting the frequency and phase match. Delay line 733 is connected from the band-pass filter 13 to multiplier 16 and color demodulator 18. The delay time to be introduced to the modulated "carrier" is controlled by a circuit including a voltage controlled oscillator 719 and a variable phase shifter 735 which is connected between the output of the oscillator 719 and a delay control input of the delay line 733.

Frequency comparator 730 provides the detection of a frequency deviation of the output of variable delay line 733 with respect to the output signal of D/A converter 729 and applies its output to the frequency control terminal of voltage-controlled oscillator 734. Similarly, phase comparator 732 provides the detection of a phase deviation of the output of the delay line 733 with respect to the DA converter output and applies its output to the phase control terminal of variable phase shifter 735.

With mode select switch 721 being switched to the write position W, digitized reference "carrier" by A/D converter 722 is written into field memory 720 under the control of address generator 724 and oscillator 725 in the same manner as described in the previous embodiments. During readout modes, modulated "carrier" is delayed by delay line 733 and compared by the frequency and phase comparators 730 and 732 with the reference "carrier" from D/A converter 729 to control the frequency and phase of the variable delay line 733 so that both frequency and phase differences reduce to zero. The frequency of reference "carrier" $S_1'$ from D/A converter 729 is tripled by frequency multiplier 31. The output of frequency multiplier 31 is multiplied in amplitude on a modulated "carrier" $S_1$ from band-pass filter 13 by multiplier 16, producing a synthesized second harmonic $S_3$ from the output of band-pass filter 19 for coupling to the color demodulator 18.

Figure 8:
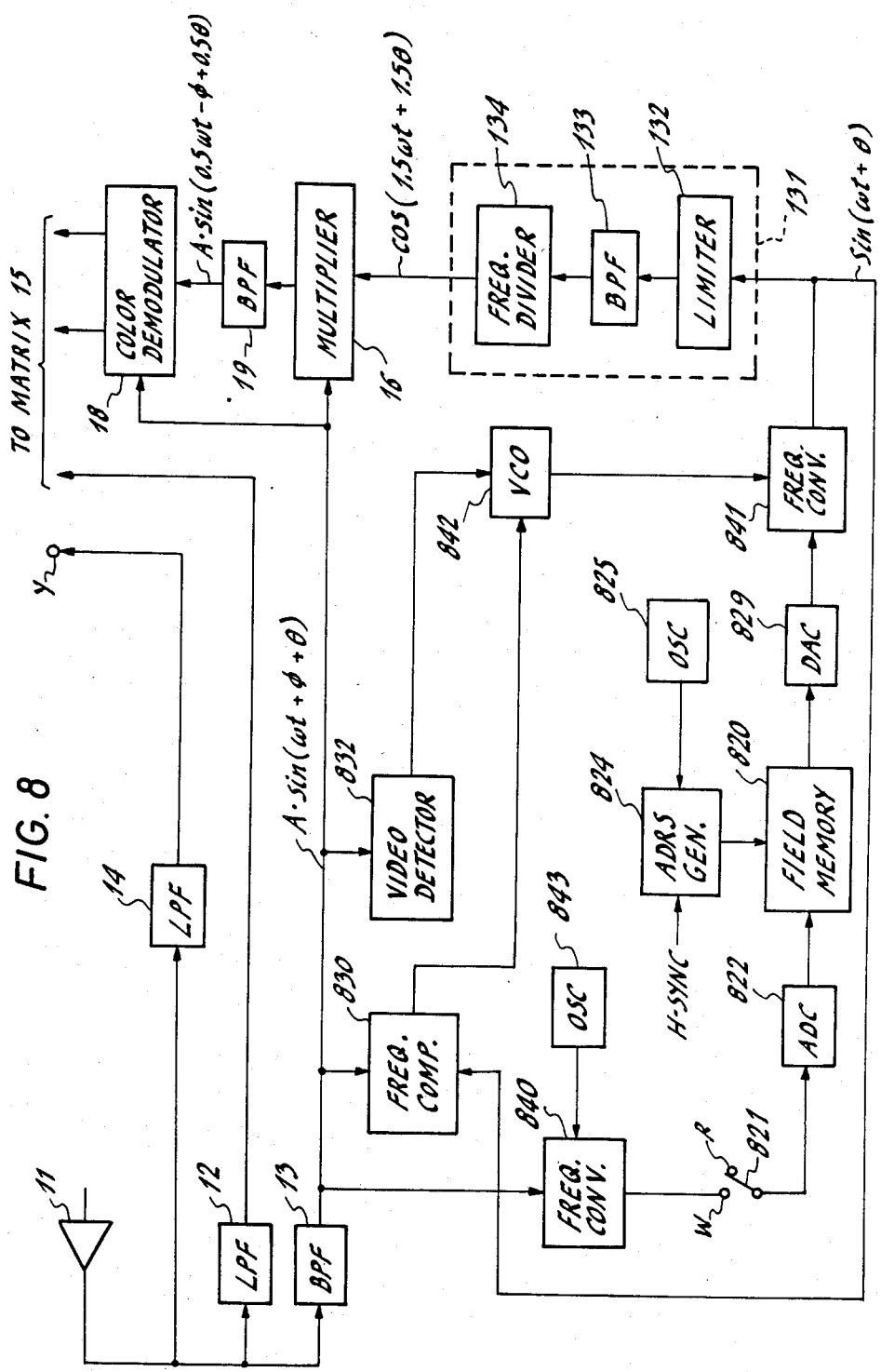
FIG. 8 is a block diagram of a second preferred embodiment of the present invention.

FIG. 8 is an illustration of a second embodiment of the present invention. In this embodiment, frequency converters 840 and 802 are connected to the input of A/D converter 822 and to the output of D/A converter 841, respectively. Frequency converter 840 functions to reduce the frequency of the reference "carrier" by mixing it with a signal from an oscillator 843, while frequency converter 841 functions to reconvert the frequency of the reference "carrier" from D/A converter 829 to the original frequency by mixing it with a signal from a voltage controlled oscillator 842.

During write-in mode, the reference "carrier" from band-pass filter 13 is reduced to a low-frequency reference "carrier" and fed through the write position of switch 821 to A/D converter 822. This frequency conversion is to eliminate the redundant information associated with the spatial frequency of the color filter 4 while retaining the amplitude and phase information. Smaller memory capacity is thus required for the field memory 820 than is required with the previous embodiments. Under the control of address generator 824 driven by oscillator 825, the digitized reference "carrier" is stored into the memory 820.

During readout modes, VCO 842 is triggered in response to an output from video carrier detector 832 to initiate oscillation. The frequency of the oscillation is determined by an output signal from frequency comparator 830 which compares the band-pass filter 13 output with the output of frequency converter 841 which is supplied with the output of oscillator 842. By feedback operation, VCO 842 is controlled so that the frequency difference is reduced to zero, so that the modulated "carrier" given by $A \cdot \sin(\omega t + \phi + \theta)$ is matched in frequency with the reconverted reference "carrier" which is given by $\sin(\omega t + \theta)$ at the output of frequency converter 841. The output of frequency converter 41 is multiplied in frequency by a factor of 1.5 by means of a frequency multiplier 131 comprising a limiter 132, a band-pass filter 133 tuned to the third harmonic of the frequency of the reference "carrier" and a frequency divider 134 which halves the frequency of the third harmonic. Frequency multiplier 131 supplies a signal $\cos(1.5\omega t + 1.5\theta)$ to amplitude multiplier 16 to multiply it with the modulated "carrier", so that the output of band-pass filter 19 is given by $A \cdot \sin(0.5\omega t - \phi + 0.5\theta)$.

It is seen that the signal supplied from band-pass filter 19 to color demodulator 18 is one-half the frequency of the modulated "carrier". In this way, the 1:2 frequency ratio and opposite phase relationships between the two inputs to color demodulator 18 are maintained as in the FIG. 1 embodiment to ensure high signal-to-noise ratios, while the absolute values of the frequencies are reduced to one-half the frequency values of the FIG. 1 embodiment. The effect of the frequency value reductions is to simplify the circuitry of the color demodulator 18.

Figure 9:
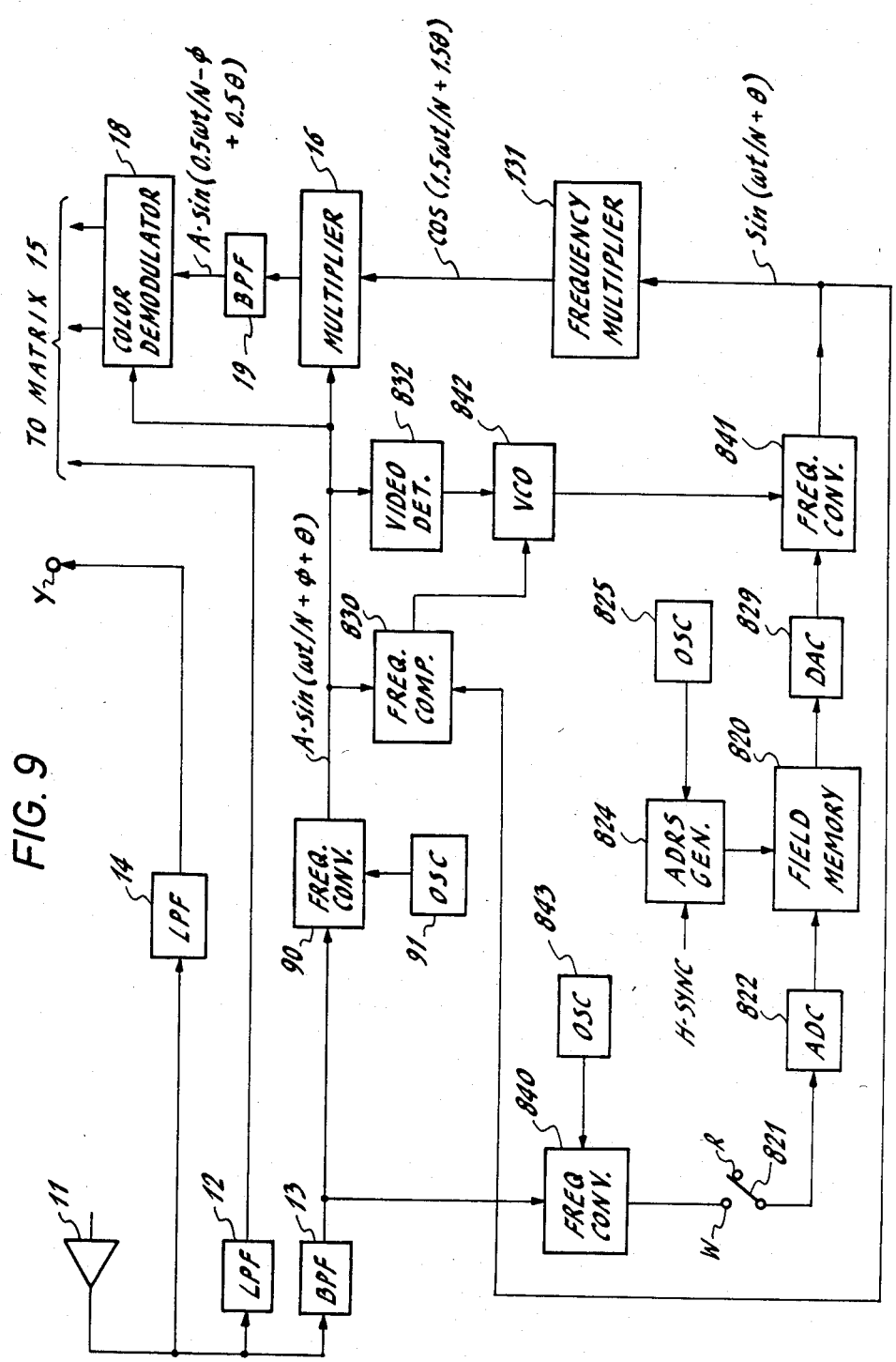
FIG. 9 is a block diagram of a third preferred embodiment of the invention.

FIG. 9 is a third embodiment of the present invention which is similar to the second embodiment with the exception that it includes a frequency converter 90 and an oscillator 91 driving the converter 90. Frequency converter 90 is connected in the circuit between band-pass filter 13 and the inputs of multiplier 16 and color demodulator 18. The function of the frequency converter 90 is to divide the frequency of the modulated "carrier" by a factor N to produce a modulated "carrier" given by $A \cdot \sin(\omega t/N + \phi + \theta/N)$. Frequency comparator 830 is connected to the output of frequency converter 90 for frequency comparison with the output of frequency converter 841. The output of frequency converter 841 is reduced in frequency and supplied as a reference "carrier" given by $\sin(\omega t/N + \theta)$ to frequency multiplier 131 which in turn multiplies its frequency by a factor of 1.5 and supplies a signal given by $\cos(1.5\omega t/N + 1.5\theta)$ to amplitude multiplier 16.

Thus, amplitude multiplier 16 provides multiplication of the frequency-divided signals and produces a signal given by $A \cdot \sin(0.5\omega t/N - \phi + 0.5\theta)$ at the output of band-pass filter 19. Because of the further reduction in the frequencies of the signals to the inputs of color demodulator 18 by the factor 1/N, this embodiment allows the use of a more simplified color demodulator.

Alternatively, the embodiment of FIG. 9 can be modified as shown in FIG. 10. This embodiment differs from the FIG. 9 embodiment in that it employs a frequency multiplier 232. Frequency multiplier 232 includes a limiter 232 and a band-pass filter 233 tuned to the third harmonic of the frequency of the reference "carrier". The output of frequency converter is tripled in frequency by multiplier 231, generating a signal given by $\cos(3\omega t/N + 3\theta)$. The latter is multiplied in amplitude by the modulated "carrier" representing $A \cdot \sin(\omega t/N + \phi + \theta)$ to produce a multiplied output representing $A \cdot \sin(2\omega t/N - \phi + 2\theta)$ at the output of band-pass filter 19. The absolute frequency values are both reduced by the factor 1/N, while retaining the 1:2 frequency ratio and opposite phase relationship as in the FIG. 9 embodiment.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. Color image pickup apparatus wherein a color image is focused on a photoelectrical conversion target of a color image pickup tube through a color stripe filter and converted to an electrostatic image which is scanned in raster form by an electron beam under the control of a deflection system in response to horizontal and vertical sync pulses to generate a color-multiplexed video signal from said photoelectrical conversion target, said color stripe filter comprising a plurality of recurrent groups of different color stripes successively arranged at periodic intervals so that said video signal has a frequency inversely proportional to the intervals at which said recurrent groups are arranged, said video signal varying in phase in accordance with relative values of primary color components contained in the color image passing through the strips of each group and varying in amplitude in accordance with intensity of said primary color components, comprising:
   a field memory;
   reading and writing means for writing into the field memory, during a write-in mode, a reference signal having a duration of at least one field derived from said target when the target is uniformly illuminated by light of a predetermined color passing through said color stripe filter and repeatedly reading the field memory during a read-out mode to generate a constant-amplitude reference video signal having said reference phase;
   frequency converting means for converting the frequency of said reference video signal so that said color-multiplexed video signal from said target and the frequency-converted reference video signal have a frequency ratio of 2:1 and an opposite phase relationship therebetween, and
   demodulating means for demodulating said colormultiplexed video signal and said frequency-converted reference video signal and deriving a pair of color component signals.

2. Apparatus as claimed in claim 1, wherein the frequency of said frequency-converted reference video signal is twice the frequency of said color-multiplexed video signal.

3. Apparatus as claimed in claim 1, wherein the frequency of said frequency-converted reference video signal is one-half the frequency of said color-multiplexed video signal.

4. Apparatus as claimed in claim 1, wherein said frequency-converting means comprises:
   frequency multiplying means for multiplying the frequency of said reference video signal by a predetermined factor; and
   amplitude multiplying means for multiplying the amplitude of the frequency-multiplied reference video signal by the amplitude of said color-multiplexed video signal to generate said frequency-converted reference signal.

5. Apparatus as claimed in claim 4, wherein said predetermined factor is equal to 3.

6. Apparatus as claimed in claim 4, wherein said predetermined factor is equal to 1.5.

7. Apparatus as claimed in claim 1, further comprising second frequency converting means for causing the frequencies of said color-multiplexed video signal and said frequency-converted reference video signal to be reduced by an equal factor before being demodulated by said demodulating means.

8. Apparatus as claimed in claim 1, further comprising control means which includes a frequency comparator for detecting a frequency difference between said reference video signal and said color-multiplexed video signal and means for controlling the frequency relationship between said reference video signal and said color-multiplexed video signal in response to the detected frequency difference so that the frequency difference reduces to zero.

9. Apparatus as claimed in claim 8, wherein said control means comprises a variable frequency oscillator coupled to said reading and writing means for generating variable frequency clock pulses as a frequency variable as a function of the detected frequency difference and reading said field memory in response to said variable frequency clock pulses.

10. Apparatus as claimed in claim 8, wherein said control means comprises means for varying a sawtooth waveform generated by said deflection system as a function of the detected frequency difference.

11. Apparatus as claimed in claim 10, further comprising a phase comparator for generating a phase difference signal representing the phase difference between said reference video signal and said color-multiplexed video signal and mean for combining the phase difference signal with said sawtooth waveform.

12. Apparatus as claimed in claim 10, further comprising a first reference voltage source for setting said sawtooth waveform varying means during the write-in mode and a second reference voltage source for centering said electron beam with respect to said target during the write-in mode.

13. Apparatus as claimed in claim 8, wherein said control means comprises a variable delay circuit for delaying said color-multiplexed video signal with respect to said reference video signal as a function of the detected frequency difference to produce a delayed color-multiplexed video signal before being applied to said demodulating means.

14. Apparatus as claimed in claim 13, further comprising a phase comparator for detecting a phase difference between said reference video signal and said color-multiplexed video signal and means for controlling the phase of the delayed color-multiplexed video signal in accordance with the detected phase difference.

15. Apparatus as claimed in claim 8, wherein said control means comprises a first frequency converter for converting said reference video signal to a lower frequency video signal before being written into said field memory during said write-in mode, a variable frequency oscillator responsive during the read-out mode to the detected frequency difference to generate a variable frequency signal, and a second frequency converter responsive to said variable frequency for reconverting said lower frequency reference video signal read out of the field memory and applying the reconverted reference video signal to said frequency converting means.

* * * * *